(12) United States Patent
Yamada

(10) Patent No.: US 7,697,048 B2
(45) Date of Patent: Apr. 13, 2010

(54) SOLID STATE IMAGING APPARATUS AND DRIVING METHOD OF THE SOLID STATE IMAGING APPARATUS USING FOUR PIXEL ADDITION

(75) Inventor: Tetsuo Yamada, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 1008 days.

(21) Appl. No.: 11/394,108

(22) Filed: Mar. 31, 2006

(65) Prior Publication Data

US 2006/0220933 A1 Oct. 5, 2006

(30) Foreign Application Priority Data

Mar. 31, 2005 (JP) .............................. 2005-102883

(51) Int. Cl.
*H04N 5/335* (2006.01)
(52) U.S. Cl. .................. 348/294; 358/513; 358/514
(58) Field of Classification Search ................ 348/294; 358/513–514
See application file for complete search history.

(56) References Cited

U.S. PATENT DOCUMENTS

| | | | |
|---|---|---|---|
| 4,972,254 A | 11/1990 | Endo et al. | |
| 6,236,434 B1 | 5/2001 | Yamada | |
| 6,795,119 B1 | 9/2004 | Oda et al. | |
| 7,292,277 B2 * | 11/2007 | Oda et al. .................... 348/315 |
| 2003/0002094 A1 * | 1/2003 | Suzuki ........................ 358/513 |
| 2003/0081132 A1 * | 5/2003 | Kuno et al. ............... 348/222.1 |
| 2004/0046881 A1 | 3/2004 | Utagawa | |
| 2004/0109060 A1 * | 6/2004 | Ishii ............................ 348/148 |
| 2004/0196396 A1 * | 10/2004 | Fujii et al. .................... 348/272 |
| 2006/0285007 A1 * | 12/2006 | Yuyama et al. ............. 348/362 |

FOREIGN PATENT DOCUMENTS

| | | |
|---|---|---|
| JP | 64-4183 A | 1/1989 |
| JP | 10-136391 A | 5/1998 |
| JP | 2002-112119 A | 4/2002 |

OTHER PUBLICATIONS

Tetsuo Yamada et al., ISSCC Digest of Technical Papers, vol. 43, (2000), pp. 110-111.

\* cited by examiner

*Primary Examiner*—Tuan Ho
*Assistant Examiner*—Kent Wang
(74) *Attorney, Agent, or Firm*—Birch, Stewart, Kolasch & Birch, LLP

(57) ABSTRACT

A solid state imaging apparatus of which spatial phases of pixels forming a first matrix of adjoining rows and adjoining columns are relatively different from each other is characterized by that an intersection of a line between two pixels to be added in a row direction and a line between two pixels to be added in a column direction approximately agreed with a center of four pixels to be added when the four pixels adjoining in the row and column directions are added, and phases of said centers of four pixels adjoining in the row direction or column direction are relatively different from each other in a second matrix consisted of a plurality of said centers of four pixels.

5 Claims, 10 Drawing Sheets

FIG. 10A
*PRIOR ART*

| | P1 | | P1 | | P1 | | P1 | | P1 | | P1 | | P1 | | P1 | |
|---|---|---|---|---|---|---|---|---|---|---|---|---|---|---|---|---|
| P4 | P3 | P4 | P3 | P4 | P3 | P4 | P3 | P4 | P3 | P4 | P3 | P4 | P3 | P4 | P3 | P4 |
| P2 | P1 | P2 | P1 | P2 | P1 | P2 | P1 | P2 | P1 | P2 | P1 | P2 | P1 | P2 | P1 | P2 |
| P4 | P3 | P4 | P3 | P4 | P3 | P4 | P3 | P4 | P3 | P4 | P3 | P4 | P3 | P4 | P3 | P4 |
| P2 | P1 | P2 | P1 | P2 | P1 | P2 | P1 | P2 | P1 | P2 | P1 | P2 | P1 | P2 | P1 | P2 |

SOLID STATE IMAGING APPARATUS AND DRIVING METHOD OF THE SOLID STATE IMAGING APPARATUS USING FOUR PIXEL ADDITION

CROSS REFERENCE TO RELATED APPLICATION

This application is based on Japanese Patent Application 2005-102883, filed on Mar. 31, 2005, the entire contents of which are incorporated herein by reference.

BACKGROUND OF THE INVENTION

A) Field of the Invention

This invention relates to a solid state imaging apparatus, especially relates to a structure of the solid state imaging apparatus for a digital still camera.

B) Description of the Related Art

FIG. 9 is a schematic plan view of a conventional solid state imaging apparatus 100.

The solid state imaging apparatus 100 includes a light receiving region 2 including a multiplicity of photoelectric conversion elements 12 and vertical electric charge transfer devices (VCCD) 14 that vertically transfer signal electric charges generated by the multiplicity of photoelectric conversion elements 12, a line memory 5 that temporally accumulates the signal electric charges transferred by the VCCD 14, a horizontal electric charge transfer device (HCCD) 3 that receives the signal charges from the line memory 5 to horizontally transfer and an output amplifier (output circuit) 4 that converts the signal electric charges to voltage to output.

In the light receiving region 2 of an imaging apparatus adopting a pixel interleaved array CCD (PIACCD) shown in the drawing, the multiplicity of the photoelectric conversion elements 12 are arranged in the so-called pixel interleaved arrangement. In each space between columns of the photoelectric conversion elements 12, a vertical electric charge transfer device 14 that reads out and vertically transfers the signal electric charges generated in the photoelectric conversion elements 12 are positioned vertically with weaving through the space of the photoelectric conversion elements 12. Each transfer channel is arranged in the weaving space formed by the pixel interleaved arrangement, and the adjacent transfer channels apart from each other via the photoelectric conversion element and come closer to each other via a channel stop region (not shown in the drawing). For example, the details of the pixel interleaved arrangement can be found in Japanese Laid-Open Patent Hei10-136391 and Tetsuo Yamada, et al, February, 2000, "A Progressive Scan CCD Imager for DSC Applications", ISSCC Digest of Technical Papers, Page 110 to 111.

Each vertical electric charge transfer device 14 is consisted of a vertical transfer channel (not shown in the drawing) and transfer electrodes formed to horizontally weave through a space between the photoelectric conversion elements 12 on an insulating film (not shown in the drawing) over the vertical transfer channel.

In the prior art shown in the drawing, it is shown an example wherein all the pixels 12 perform photoelectric conversion of image information in same color (P1 to P4). The same color is, for example, one of three primary colors of red (R), blue (B) and green (G) or white, etc. Moreover, the symbols P1 to P4 are added to every line (every line or row of the photoelectric conversion element) for convenience of an explanation; however, all of the photoelectric conversion elements 12 have same function for picking up the same colored image signals.

Normally, the signal charges photoelectric-converted by the pixels 12 of the P1 and the P2 are transferred by the same transfer line of the VCCD 14 in parallel. The P3 and the P4 are also transferred by the same transfer line in parallel. The last transfer line of the VCCD 14 is continued with the CCD line memory (LM) 5, and the transferred signal electric charges are accumulated in the line memory 5.

A technique for adding the same colored adjacent signals is used for improving a frame rate (the number of frames/sec.) at a time of animation photographing or for taking a dark scene brightly.

In the drawing, the line memory 5 and the multi-phase HCCD 3 have a function for mixing the same colored horizontally adjacent signal electric charges by addition. Only the P1 signals are transferred to the HCCD 3 by imposing high-level voltage only to the φ2A and the φ2B to make the LM a low level. Then, the P1 signals move under the electrodes of φ1A and the φ1B by imposing a low-level voltage on the electrodes of the φ2A and the φ2B and imposing a high-level voltage on the φ1A and φ1B, and the P2 signals are transferred from the line memory 5. Then, the P1 signals and the P2 signals are added in the HCCD 3.

As described in the above, an amount of the electric charges for one signal is amplified in twice, and the number of the pixels of the image output becomes a half. The necessary time for outputting the signals of all the pixels can be decreased to a half. As a result, sensitivity and the frame rate can be doubled comparing to those in the conventional technique.

Recently as a number of pixels in a solid state imaging device increases, a four-pixel addition technique becomes effective to further improvement of sensitivity. In this case, horizontal resolution will be one quarter and a gap in a horizontal direction greatly increases when horizontally adjoining four pixels are added. Therefore, in the four-pixel addition technique, it is preferable to add horizontally adjoining two pixels and vertically adjoining two pixels.

FIG. 10 are schematic views for explaining the 4-pixel addition (mixture by addition) by the conventional solid state imaging apparatus 100.

FIG. 10A shows an arrangement when the signals have been transferred from the pixels 12 to the VCCD 14. The first line to which the P2 signals and the P1 signals are alternatively arranged and the second line to which the P4 signals and the P3 signals are alternatively arranged are arranged alternatively.

FIG. 10B shows a transition of a condition from a condition wherein the P2 and P1 signals of the first line have been transferred to the line memory 5, and then the P4 and P3 signals of the second line are transferred to the line memory 5 so as to the signals of the two lines are added together in the line memory 5 to a condition wherein only signal columns where the P1 and P3 signals have been added are selectively transferred to the HCCD 3 and, in addition to that, the signals transferred to the HCCD 3 are shifted by one step to a left direction (a direction toward the output) inside the HCCD 3. Thereafter, as shown in FIG. 10C, signal columns where the P2 and P4 signals have been added are transferred to the HCCD 3, and the signal electric charges of P1 to P4 are added in the HCCD 3. By repeating the above-described series of operations, time sequential outputs of four-pixel addition as shown in FIG. 10D can be obtained from the signal arrangement shown in FIG. 10A.

FIG. 11A is a schematic plan view of the light receiving region 2 showing a combination of four pixels added by the four-pixel addition by the conventional solid state imaging apparatus 100. A sampling unit of an image will be a region enclosed by a parallelogram as shown in the drawing. FIG. 11B and FIG. 11C show two-dimensional Nyquist limits wherein a center of the sampling unit (shown by a black circle) is placed as a center of an image sampling (the image sampling center).

FIG. 11B is a graph representing the Nyquist limits without the addition, and FIG. 11C is a graph representing the Nyquist limits with the conventional four-pixel addition shown in FIG. 10.

Since each pixel forms a tetragonal matrix with an arrangement pitch 2 in a horizontal and a vertical directions with other pixels, the two-dimensional Nyquist limits in case of outputting the signals of all the pixels independently without pixel addition will be 1 p in the horizontal and the vertical directions, that is, the Nyquist limits in both horizontal and vertical directions become the same.

When the conventional four-pixel addition shown in FIG. 10 is executed, the Nyquist limit in the horizontal direction will be a half of that without the pixel addition, and the Nyquist limit in the vertical direction will be a quarter of that without the pixel addition. That is, vertical resolution will be a half of horizontal resolution. Moreover, since the shape of the sampling unit is asymmetry in the horizontal and vertical directions, a MTF property (resolution property) will be changed significantly according to a direction.

SUMMARY OF THE INVENTION

It is an object of the present invention to provide a solid state imaging apparatus that can prevent degradation of vertical resolution according to a 4-pixel addition while restraining a change in a resolution property according to a direction in minimum by making a shape of a region forming a sampling unit symmetry in horizontal and vertical directions.

According to one aspect of the present invention, there is provided a solid state imaging apparatus of which spatial phases of pixels forming a first matrix of adjoining rows and adjoining columns are relatively different from each other, wherein an intersection of a line between two pixels to be added in a row direction and a line between two pixels to be added in a column direction approximately agreed with a center of four pixels to be added when the four pixels adjoining in the row and column directions are added, and phases of said centers of four pixels adjoining in the row direction or column direction are relatively different from each other in a second matrix consisted of a plurality of said centers of four pixels.

According to another aspect of the present invention, there is provided a solid state imaging apparatus, comprising: a plurality of pixels forming a first matrix of adjoining rows and adjoining columns, a spatial phase of each pixel being relatively different; a plurality of vertical transfer devices which transfer signals of two rows of the pixels of which phases are different in column direction in parallel as one line; a line memory that receives and temporarily stores said one line of signal electric charges transferred in parallel; a horizontal transfer device to which a plurality of electrically independent control voltages are impressed and which receives the signal electric charges selectively read out from said line memory and transfers the signal electric charges serially to a horizontal direction; and an output device that converts the signal electric charges transferred by the horizontal transfer device into voltage and outputs the voltage, wherein a signal of one pixel at a cycle of four-pixel consisting one group of four signals horizontally adjoining with each another in said one line of the signal electric charges is added to a signal of a preceding line adjoining to said one line, transferred before said one line and accumulated in said horizontal transfer device; after all the signal electric charges in the horizontal transfer device are output, signals of three pixels in said one group remaining in said line memory are added in the horizontal transfer device to vacate said line memory, and simultaneously a succeeding line of signal electric charges accumulated in said vertical transfer device are transferred to said line memory; and a signal of one pixel at a cycle of four-pixel consisting one group of four signals horizontally adjoining with each another in another line of the signal electric charges of which spatial phase is 180 degree different from a spatial phase of said one pixel in said one line is selectively read out from said line memory to said horizontal transfer device and added to said added signals of three pixels.

According to still another aspect of the present invention, there is provided a solid state imaging apparatus, comprising: a plurality of pixels forming a first matrix of adjoining rows and adjoining columns, a spatial phase of each pixel being relatively different; a plurality of vertical transfer devices which transfer signals of two rows of the pixels of which phases are different in column direction in parallel as one line; a line memory that receives and temporarily stores said one line of signal electric charges transferred in parallel; a horizontal transfer device to which a plurality of electrically independent control voltages are impressed and which receives the signal electric charges selectively read out from said line memory and transfers the signal electric charges serially to a horizontal direction; and an output device that converts the signal electric charges transferred by the horizontal transfer device into voltage and outputs the voltage, wherein signals of three pixels at a cycle of four-pixel consisting one group of four signals horizontally adjoining with each another in said one line of the signal electric charges are added to a signal of a preceding line adjoining to said one line, transferred before said one line and accumulated in said horizontal transfer device; after all the signal electric charges in the horizontal transfer device are output, a signal of one pixel in said one group remaining in said line memory is transferred to the horizontal transfer device to vacate said line memory, and simultaneously a succeeding line of signal electric charges accumulated in said vertical transfer device are transferred to said line memory; and signals of three pixels at a cycle of four-pixel consisting one group of four signals horizontally adjoining with each another in another line of the signal electric charges of which spatial phase is 180 degree different from a spatial phase of said three pixels in said one line are selectively read out from said line memory to said horizontal transfer device and added to previously transferred said signal of one pixel.

According to the present invention, a solid state imaging apparatus that can prevent degradation of vertical resolution according to a 4-pixel addition while restraining a change in a resolution property according to a direction in minimum by making a shape of a region forming a sampling unit symmetry in horizontal and vertical directions can be provided.

BRIEF DESCRIPTION OF THE DRAWINGS

FIG. 10A to FIG. 10D are schematic views for explaining the 4-pixel addition (mixture by addition) by the conventional solid state imaging apparatus 100.

DETAILED DESCRIPTION OF THE PREFERRED EMBODIMENTS

Figure 1:
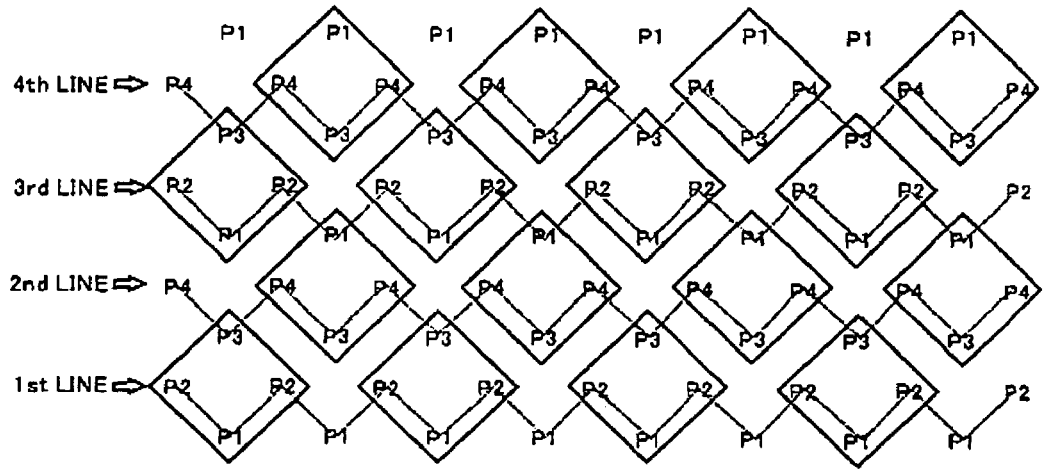
FIG. 1 is a schematic plan view of a light receiving region 2 indicating a combination of 4-pixel addition (mixture by addition) according to a first embodiment of the present invention.

FIG. 1 is a schematic plan view of the light receiving region 2 showing a combination of four pixels added by the four-pixel addition according to a first embodiment of the present invention. A sampling unit of an image will be a region enclosed by a parallelogram as shown in the drawing.

Figure 9:
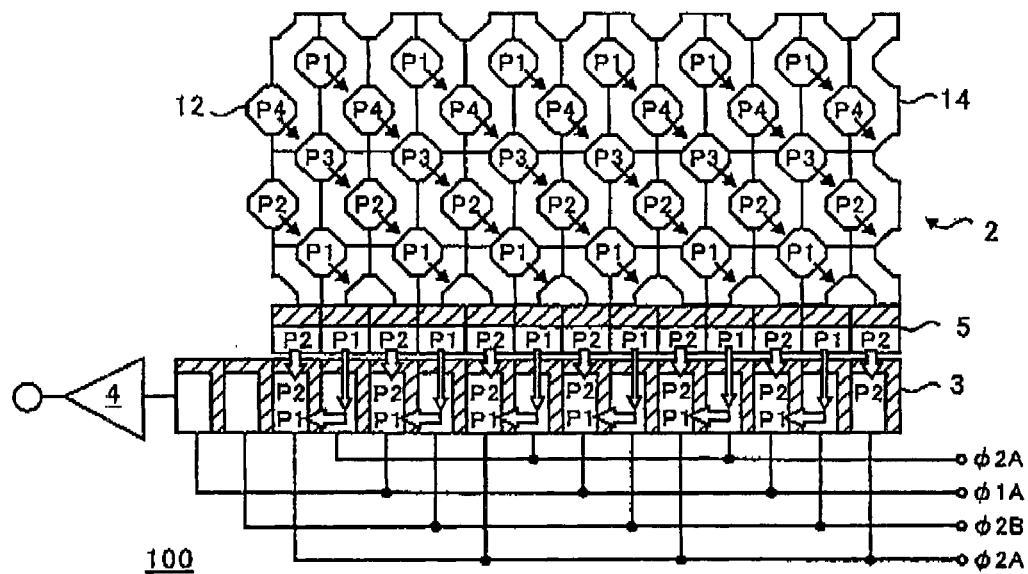
FIG. 9 is a schematic plan view of a conventional solid state imaging apparatus 100.

Since a solid state imaging apparatus according to the first and the later described second embodiments of the present invention and the solid state imaging apparatus 100 according to the prior art shown in FIG. 9 is the same in terms of a hardware structure, only difference between them is a technique for adding signal electric charges; therefore, the explanations for the hardware structure will be omitted. That is, the solid state imaging apparatus 100 according to the embodiments of the present invention includes a light receiving region 2 including a multiplicity of photoelectric conversion elements 12 and vertical electric charge transfer devices (VCCD) 14 that vertically transfer signal electric charges generated by the multiplicity of photoelectric conversion elements 12, a line memory 5 that temporally accumulates the signal electric charges transferred by the VCCD 14, a horizontal electric charge transfer device (HCCD) 3 that receives the signal charges from the line memory 5 to horizontally transfer and an output amplifier (output circuit) 4 that converts the signal electric charges to voltage to output.

Moreover, details of the structure of the line memory 5 and the horizontal adding circuit (HCCD 3) can be found in the invention by the same inventor as the present invention, that is, the embodiments of the Japanese Patent Application 2002-295896 (Japanese Laid-Open Patent 2002-112119), the entire contents of which are incorporated herein by reference.

Moreover, as similar to the example shown in FIG. 9, it is shown an example wherein all the pixels 12 perform photoelectric conversion of image information in same color (P1 to P4). The same color is, for example, one of three primary colors of red (R), blue (B) and green (G) or white, etc. Moreover, the symbols P1 to P4 are added to every line (every line or row of the photoelectric conversion element) for convenience of an explanation; however, all of the photoelectric conversion elements 12 have same function for picking up the same colored image signals.

FIG. 2A to FIG. 4B are schematic views for explaining the 4-pixel addition (mixture by addition) according to the first embodiment of the present invention.

Figure 2A:
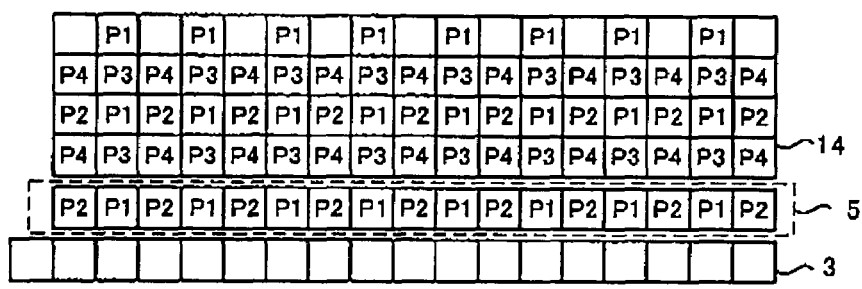
FIG. 2A to FIG. 2C are schematic views for explaining the 4-pixel addition (mixture by addition) according to the first embodiment of the present invention.

FIG. 2A shows a condition wherein after all signal electric charges have been transferred to the VCCD 14 from the pixels 12, the transferred signal electric charges have been shifted downward vertically by one transferring step in the VCCD 14, and the signal electric charges in the first line (the P1 and the P2) have been transferred to the line memory 5.

Figure 2B:
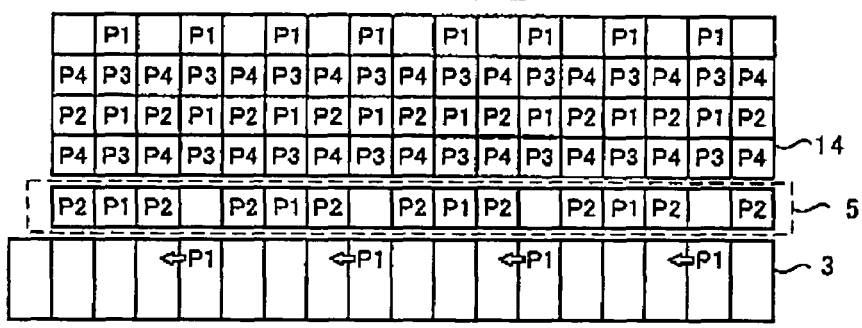
Figure 2C:
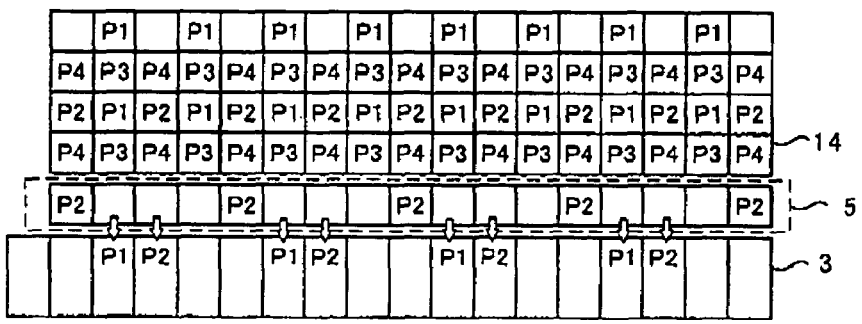

As shown in FIG. 2B, from the condition shown in FIG. 2A, the selected P1 signals (the P1 signals in the fourth, eighth, twelfth and sixteenth columns from the left in the drawing) are transferred to the HCCD 3 to be drained as unnecessary electric charges. Thereafter, as shown in FIG. 2C, the P1 signals remaining in the line memory 5 and the P2 signals adjoining to the remaining P1 signals are selectively transferred to the HCCD 3.

Figure 3A:
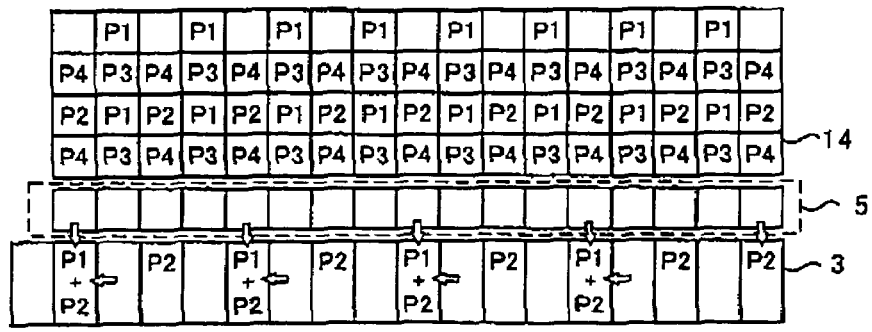
FIG. 3A to FIG. 3D are schematic views for explaining the 4-pixel addition (mixture by addition) according to the first embodiment of the present invention.

Next, as shown in FIG. 3A, only the P1 signals are transferred to the output side (a position corresponding to the P2 signals remaining in the line memory 5) for one electrode in the HCCD 3. Moreover, the P2 signals remaining in the line memory are transferred to the HCCD 3, and each of the P1 signals and each of the P2 signals are mixed by the addition.

Figure 3B:
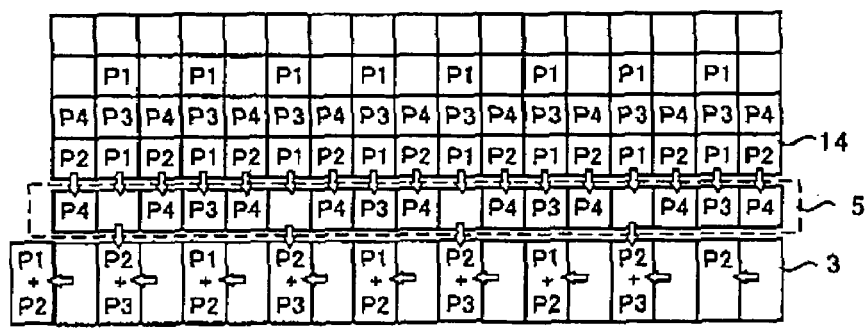
Figure 3C:
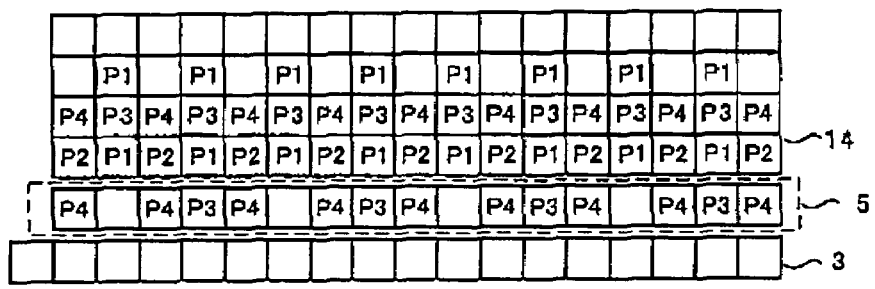

Next, as shown in FIG. 3B, the signal electric charges in the VCCD 14 are transferred (line shifted) by one transfer step, and the signal electric charges (P3 and P4) in the second line are transferred to the line memory 5. In the HCCD3, all the electric charges are transferred by one step (one electrode) to the left direction (direction toward the output), and the non-added P2 signals are moved to under the P3 signals in the line memory 5. After that, the selected P3 signals (the P3 signals in the second, sixth, tenth and fourteenth columns from the left in the drawing) are transferred to the HCCD 3 to be mixed by addition with the P2 signals in the HCCD 3. From that condition, all the signal electric charges in the HCCD 3 are transferred to the left direction (direction of the output) to be output from the output circuit 4 (FIG. 9). When each of the P1 signals added with the P2 signals and each of the P2 signals added with the P3 signals are mixed by addition in the well-known floating-type electric charge detecting unit of the output circuit 4 or in the peripheral part of that, the first line output of the four-pixel addition signal can be obtained. FIG. 3C shows a condition when all the signal electric charges in the HCCD 3 are read out. From that condition shown in FIG. 3C, four-pixel addition for the second line will be executed by the same processes as those explained with reference to FIG. 2C to FIG. 3B.

Figure 3D:
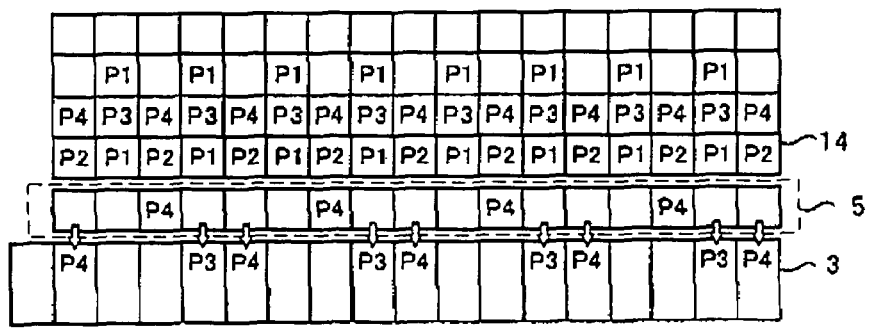
Figure 4A:
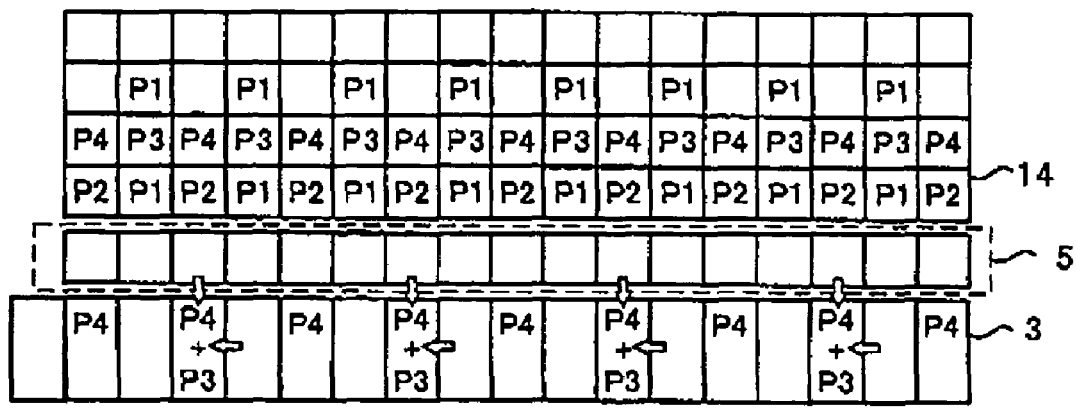
FIG. 4A and FIG. 4B are schematic views for explaining the 4-pixel addition (mixture by addition) according to the first embodiment of the present invention.

As shown in FIG. 3D, the P3 signals remaining in the line memory 5 and the P4 signals adjoining to the right side of the P3 signals are selectively transferred to the HCCD 3. Next, as shown in FIG. 4A, only the P3 signals are transferred to the output side by one step (positions corresponding to the P4 signals remaining in the line memory 5) in the HCCD 3. Moreover, the P4 signals remaining in the line memory 5 are transferred to the HCCD 3, and each of the P3 signals and each of the P4 signals are mixed by addition.

Figure 4B:
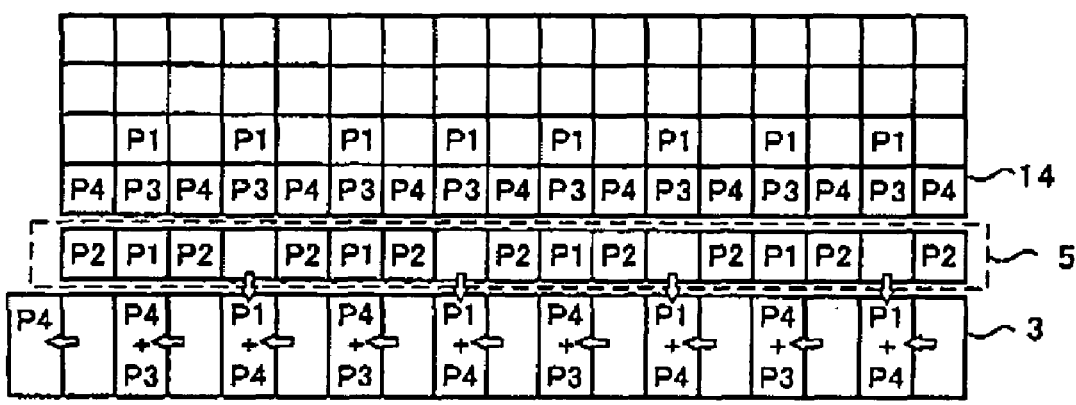

Next, as shown in FIG. 4B, the signal electric charges in the VCCD 14 are transferred (line shifted) by one transfer step, and the signal electric charges (P1 and P2) in the third line are transferred to the line memory 5. All the signal electric charges are transferred to the left direction (direction of the output) by one step (one electrode) in the HCCD 3, and the non-added P4 signals are moved to under the P1 signals in the line memory 5. After that, the selected P1 signals (the P1 signals in the fourth, eighth, twelfth and sixteenth columns from the left in the drawing) are transferred to the HCCD 3 to be mixed by addition with the P1 signals in the HCCD 3. From that condition, all the signal electric charges in the HCCD 3 are transferred to the left direction (direction of the output) to be output from the output circuit 4 (FIG. 9). When the each of P3 signals added with the P4 signals and each of the P1 signals added with the P4 signals are mixed by addition in the well-known floating-type electric charge detecting unit of the output circuit 4 or the peripheral part of that, the second line output of the four-pixel addition signal can be obtained.

After that the 4-pixel addition output according to the first embodiment of the present invention can be obtained by repeating the above processes (processes from FIG. 2C to FIG. 4B).

FIG. 5A to FIG. 7B are schematic views for explaining the four-pixel addition (mixture by addition) according to a second embodiment of the present invention.

The second embodiment is different from the above-described first embodiment in that the four-pixel addition is executed in the HCCD 3 and that transferring steps of the HCCD 3 not in use transfer four-pixel added signals of the next line. That is, a data rate can be doubled from that of the first embodiment by transferring all the signal electric charges in the HCCD 3 to the output circuit 4.

Figure 5A:
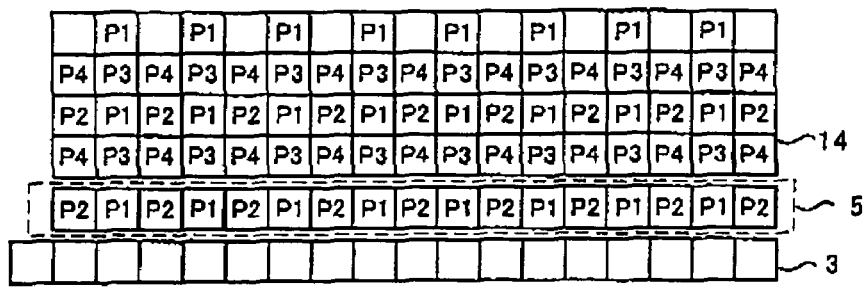
FIG. 5A to FIG. 5D are schematic views for explaining the 4-pixel addition (mixture by addition) according to a second embodiment of the present invention.

FIG. 5A shows a condition after all the signal electric charges are transferred to the VCCD 14 from the pixels 12 and transferred downward vertically by one transferring step in the VCCD 14, and the first line signal electric charges (the P1 and the P2) are transferred to the line memory 5.

Figure 5B:
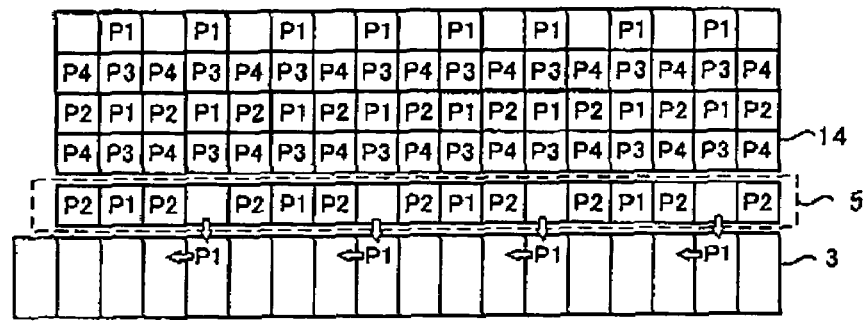
Figure 5C:
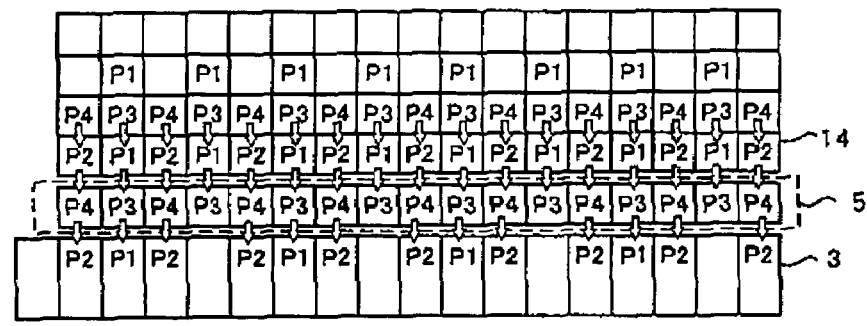

From that condition, as shown in FIG. 5B, the selected P1 signals (the P1 signals in the fourth, eighth, twelfth and sixteenth columns from the left side in the drawing) are transferred to the HCCD 3 and drained as unnecessary electric charges. Thereafter, as shown in FIG. 5C, the P1 signals and the P2 signals remaining in the line memory 5 are selectively transferred to the HCCD 3.

Figure 5D:
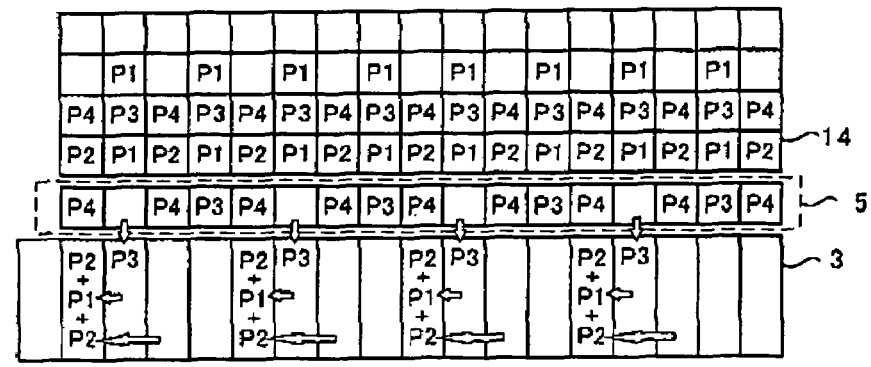
Figure 6A:
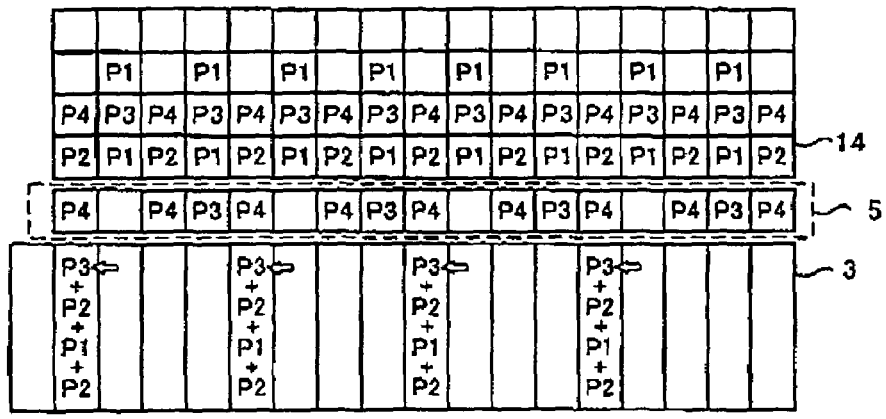
FIG. 6A to FIG. 6C are schematic views for explaining the 4-pixel addition (mixture by addition) according to the second embodiment of the present invention.
Figure 6B:
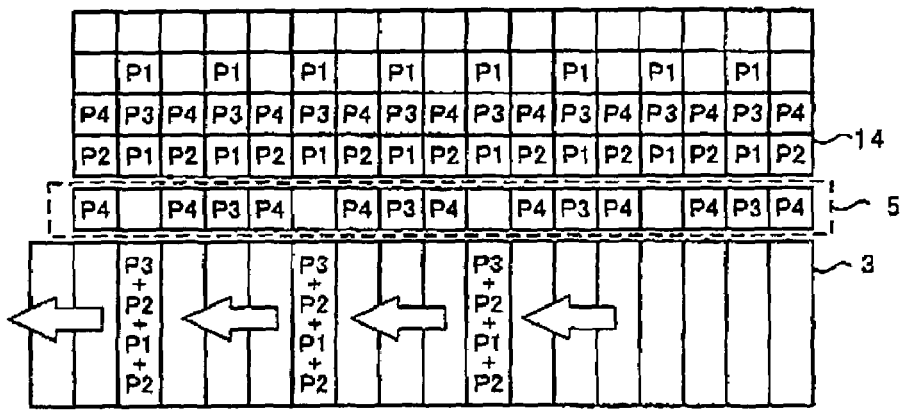

Next, as shown in FIG. 5D, the P1 signals are transferred to the output side by one electrode in the HCCD 3, and each of the P1 signals will be added with two P2 signals to form P1+P2+P2 signals by transferring one of each pair of P2 signals to the output side by two electrodes. Simultaneously, the P3 signals (the P3 signals in the second, sixth, tenth and fourteenth columns from the left side in the drawing) selected from the signal electric charges of the second line of the VCCD 14 transferred to the line memory 5 are transferred to the HCCD 3, and a first line of the four-pixel added signals (P1+P2+P2+P3 signals) as shown in FIG. 6A are formed by transferring the selected P3 signals to the output side by one electrode. Thereafter, as shown in FIG. 6B, the four-pixel added signals (P1+P2+P2+P3 signals) are transferred to the output side by three electrodes in the HCCD 3.

Figure 6C:
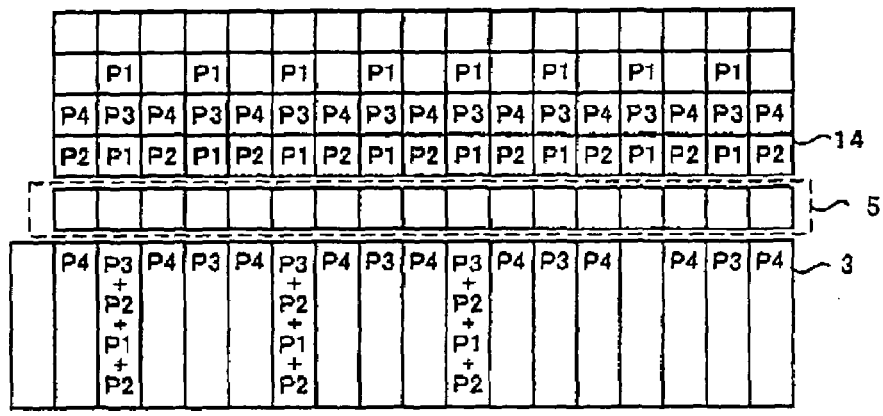
Figure 7A:
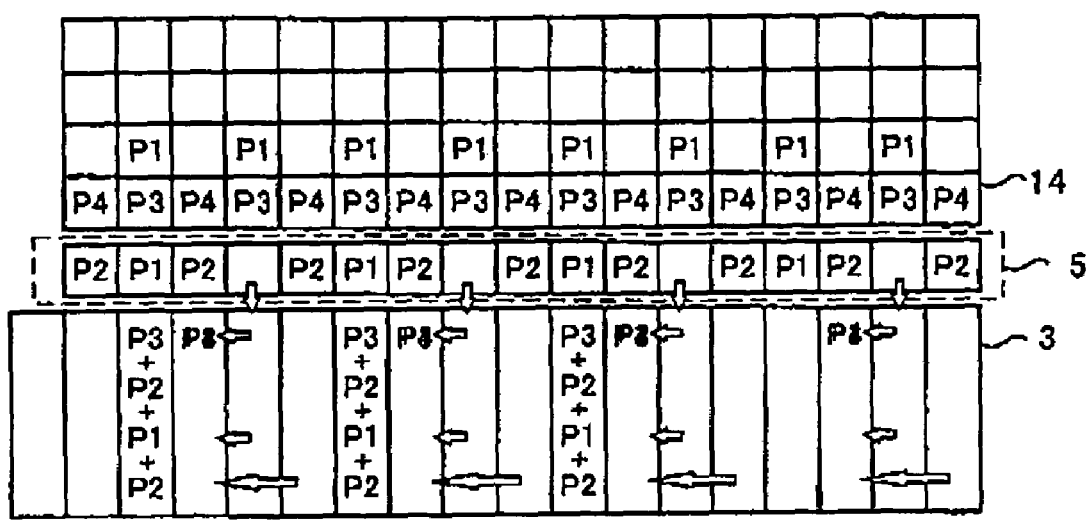
FIG. 7A and FIG. 7B are schematic views for explaining the 4-pixel addition (mixture by addition) according to the second embodiment of the present invention.

Next, as shown in FIG. 6C, all the P3 and the P4 signals remaining in the line memory 5 are transferred to the HCCD 3. Thereafter, as shown in FIG. 7A, the P3 signals are transferred to the output side by one electrode in the HCCD 3, and the P4 signals are transferred to the output side by two electrodes (P4, P3 and P4) so that the signals for every three pixels are added to form P3+P4+P4 signals. Simultaneously, the P1 signals (the P1 signals in the fourth, eighth, twelfth and sixteenth columns from the left side in the drawing) selected from the signal electric charges of the third line of the VCCD 14 transferred to the line memory 5 are transferred to the HCCD 3, and a second line of the four-pixel added signals (P1+P3+P4+P4 signals) as shown in FIG. 7A are formed by transferring the selected P1 signals to the output side by one electrode.

Figure 7B:
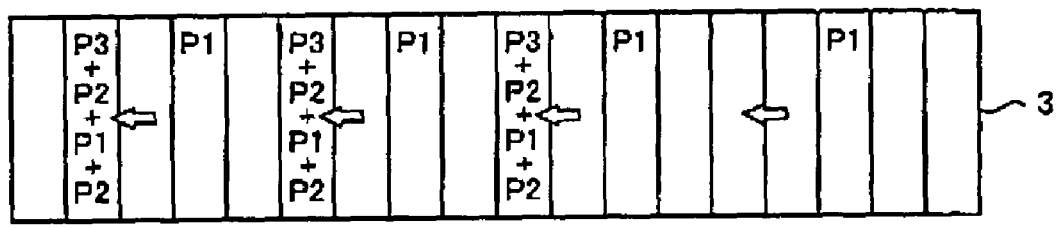

Next, as shown in FIG. 7B, the four-pixel added signals (P1+P2+P2+P3 signals) of the first line are transferred to the output side by one electrode in the HCCD 3, so that the well-known two-phase CCD driving technique can be applied. Thereafter, by impressing two-phase driving pulses to the HCCD 3, the first and the second lines of the four-pixel added signals are output from the output circuit 4 as a series of multiplexed time-sequential signals. The first signal line and the second signal line of the four-pixel added signal electric charges can be easily separated, for example, by an external sampling circuit.

All the four-pixel added signal electric charges can be output by repeating the above-described operations.

A main feature of the second embodiment is that two signal lines of the four-pixel added signal electric charges can be output during one HCCD scanning period, and as a result, a time for outputting signals for all the pixels can be a half of that in the first embodiment; therefore, a frame rate can be doubled. However, the second embodiment requires doubling a transferring capacity of the HCCD 3 comparing to the first embodiment or restraining the maximum capacity of signal electric charge of one pixel at about half of that in the first embodiment.

Figure 8A:
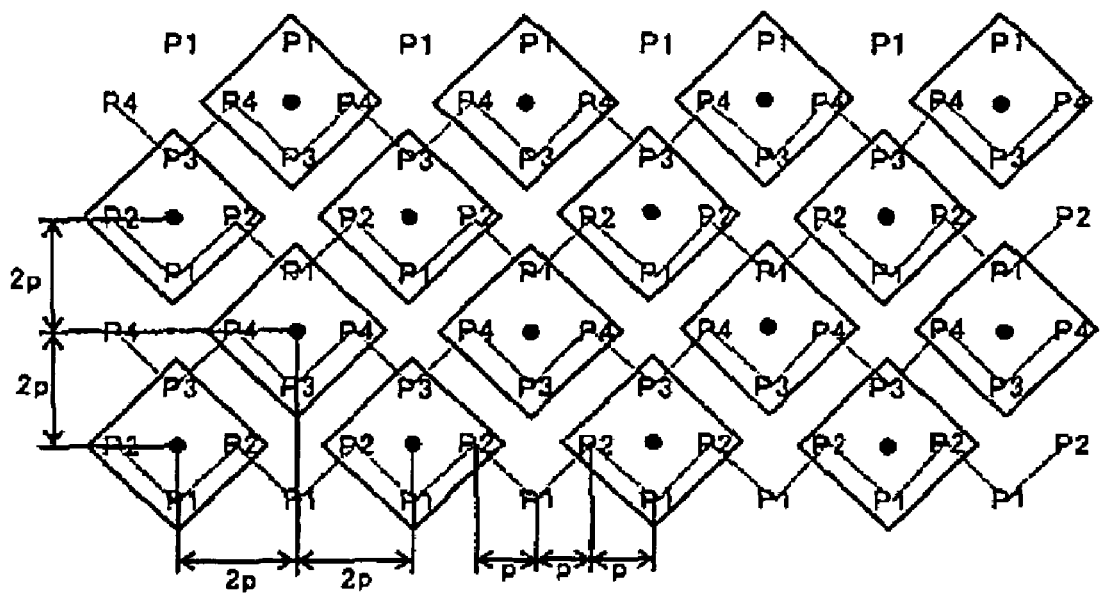
FIG. 8A is a schematic plan view of a light receiving region 2 showing a combination of four pixels to be added according to the first and second embodiments.

FIG. 8A is a schematic plan view of the light receiving region 2 showing a combination of the four-pixel addition according to the first and the second embodiments of the present invention. In the embodiments of the present invention, spatial phases of the pixels forming a matrix are shifted, for example, by 180 degrees between adjacent rows and between adjacent columns. Moreover, a sampling unit on an image after the four-pixel addition according to the embodiments of the present invention will be a region enclosed by a diamond shape as shown in the drawing. A center of each sampling unit is arranged by inverting (spatially interleaving) its spatial phase in every line as same as an arrangement of each pixel without addition.

Figure 8B:
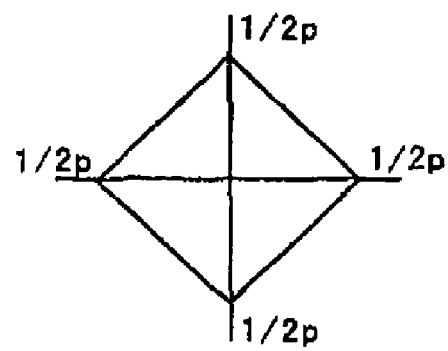
FIG. 8B shows two-dimensional Nyquist limits with placing a center (indicated with a black circle in the drawing) of each sampling unit at an image-sampling center.

FIG. 8B shows two-dimensional Nyquist limits with placing a center (indicated with a black circle in the drawing) of each sampling unit at an image-sampling center. Further, the image-sampling center is an intersection of a line between two pixels to be added in a row direction and a line between two pixels to be added in a column direction and is agreed or approximately agreed with a center of four pixels to be added. Moreover, the image sampling center is characterized by that phases of the image sampling centers in the row direction or in the column direction are relatively different from each other, for example, by 180 degrees.

Figure 11A:
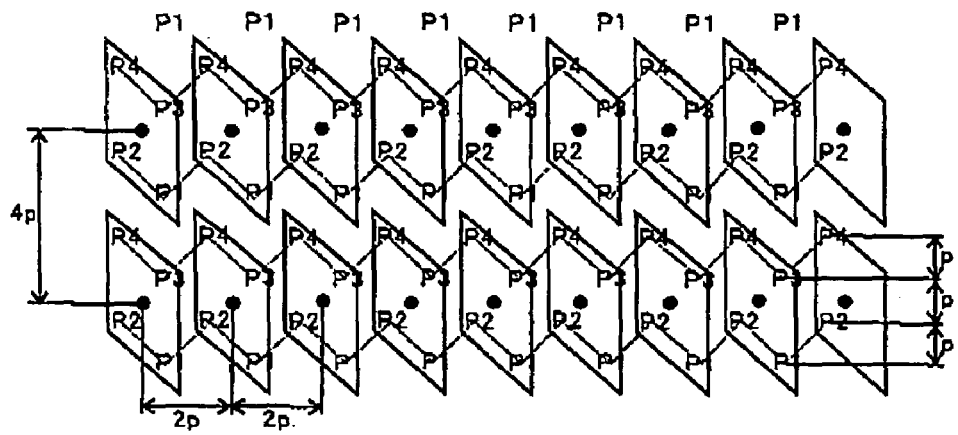
FIG. 11A is a schematic plan view of a light receiving region 2 showing a combination of four pixels to be added according to the first and second embodiments.
Figure 11B:
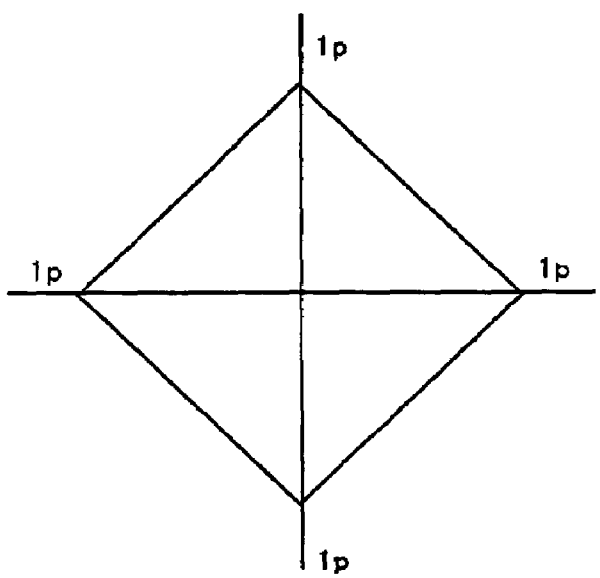
FIG. 11B and FIG. 11C are diagrams showing two-dimensional Nyquist limits with placing a center (indicated with a black circle in the drawing) of each sampling unit at an image-sampling center.
Figure 11C:
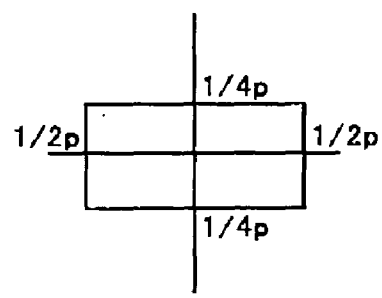

Obviously from the drawing in FIG. 8B, the Nyquist limits in the horizontal and vertical directions are the same and will be ½p when a pixel pitch without addition is defined as p. That is, the vertical Nyquist limit according to the embodiments of the present invention has been enlarged by twice as the vertical Nyquist limit (¼p) in the conventional four-pixel addition shown in FIG. 11C. That is, a vertical resolution is doubled comparing to the conventional technique.

According to the embodiments of the present invention, a natural image can be reproduced because horizontal and vertical resolutions are the same. Moreover, since an image arrangement after the four-pixel addition is similar to an image arrangement without addition, one image signal process can be used for both images with and without addition; therefore, an image processing system can be simplified.

According to the first and the second embodiment of the present invention, it can be obtained that the arrangement of the four-pixel addition units having similar shape to the pixel arrangement without addition wherein spatial phases of the pixels are shifted, for example, by 180 degrees between adjacent rows and between adjacent columns. Therefore, the Nyquist limits of the image sampling centers can be maintained to be the same in horizontal and vertical directions and to be a half of those without addition. Therefore, the resolution after the four-pixel addition can be maximized.

Moreover, an image signal can be obtained by the common signal processing with the non-added signal because the non-added signal and the four-pixel added signal have the similar image-sampling arrangement.

Furthermore, according to the first and the second embodiments of the present invention, the four-pixel addition can increase sensitivity by four times and a frame rate by four times.

Moreover, by separating irradiating light into a plurality of selected light wave ranges and irradiating the separated light into a plurality of solid state imaging apparatuses to which the first or the second embodiment of the present invention is applied, a multi-plate (e.g., three plates or so-called three-CCD) type color imaging apparatus having the maximized resolution comparing to the above-described four-pixel addition can be realized.

The present invention has been described in connection with the preferred embodiments. The invention is not limited only to the above embodiments. It is apparent that various modifications, improvements, combinations, and the like can be made by those skilled in the art.

What are claimed are:

1. A solid state imaging apparatus, comprising:
a plurality of pixels forming a first matrix of adjoining rows and adjoining columns, wherein the pixels of adjoining rows and adjoining columns are relatively shifted from each other;
a plurality of vertical transfer devices that transfer signals of two rows of the pixels, the pixels of the two rows being relatively shifted from each other, in parallel as one line;
a line memory that receives and temporarily stores said one line of signal electric charges transferred in parallel;
a horizontal transfer device;
an impressing device that impresses a plurality of electrically independent control voltages, wherein said impressing device is configured to impress said control voltages such that said horizontal transfer device receives signal electric charges selectively read out from said line memory and transfers the signal electric charges serially in a horizontal direction; and
an output device that converts the signal electric charges transferred by the horizontal transfer device into voltage and outputs the voltage, wherein
signal electric charges of four pixels of said first matrix are added in said horizontal transfer device and said line memory, the four pixels consisting of two pixels adjacent in a row and two pixels adjacent in a column of said first matrix,
an intersection of a line between the two pixels in the row and a line between the two pixels in the column approximately corresponds with a center of the four pixels, and said centers of four pixels form a second matrix of rows and columns, wherein the centers of four pixels of adjacent rows and adjacent columns are relatively shifted from each other.

2. A solid state imaging apparatus, comprising:
a plurality of pixels forming a first matrix of adjoining rows and adjoining columns, wherein the pixels of adjoining rows and adjoining columns are relatively shifted from each other;
a plurality of vertical transfer devices which transfer signals of two rows of the pixels, the pixels of the two rows being relatively shifted from each other, in parallel as one line;
a line memory that receives and temporarily stores said one line of signal electric charges transferred in parallel;
horizontal transfer device;
an impressing device that impresses a plurality of electrically independent control voltages, wherein said impressing device is configured to impress said control voltages such that said horizontal transfer device receives signal electric charges selectively read out from said line memory and transfers the signal electric charges serially in a horizontal direction; and
an output device that converts the signal electric charges transferred by the horizontal transfer device into voltage and outputs the voltage,
wherein said impressing device is configured to impress said control voltages such that a signal of one pixel (left P3) at a cycle of four-pixel signals of four pixels horizontally adjoining with each another in said one line of the signal electric charges is added to a signal of a preceding line (right P2) adjoining to said one line, said preceding line transferred before said one line and accumulated in said horizontal transfer device, wherein said four pixels form one group;
after all the signal electric charges in the horizontal transfer device are output, signals of the remaining three pixels (left P4, right P4, right P3) in said one group in said line memory are transferred to the horizontal transfer device and two pixels (right P3, left P4) are added in the horizontal transfer device to vacate said line memory, whereby two pixels (left P4, right P3) are transferred to the horizontal transfer device and then the third remaining pixel (right P4) is transferred to the horizontal transfer device and added to a pixel (right P3) in the horizontal transfer device, and simultaneously a succeeding line of signal electric charges accumulated in said vertical transfer device are transferred to said line memory; and
a signal of one pixel (right P1) at a cycle of four-pixel signals of four pixels horizontally adjoining with each another in said succeeding line of the signal electric charges, a spatial phase of said succeeding line being 180 degree different from a spatial phase of said one pixel in said one line, is selectively read out from said line memory to said horizontal transfer device and added to a signal of the non-added pixel (left P4) in said one group; and
after all the signal electric charges in the horizontal transfer device are output, signals of the remaining three pixels (left P2, left P1, right P2) in said succeeding line in said line memory are transferred to the horizontal transfer device and two pixels (left P1, left P2) are added in the horizontal transfer device, whereby two pixels (left P1, right P2) are transferred to the horizontal transfer device and then the third remaining pixel (left P2) is transferred to the horizontal transfer device and added to a pixel (left P1) in the horizontal transfer device.

3. A solid state imaging apparatus, comprising:
a plurality of pixels forming a first matrix of adjoining rows and adjoining columns, wherein the pixels of adjoining rows and adjoining columns are relatively shifted from each other;
a plurality of vertical transfer devices for transferring signals of two rows of the pixels, the pixels of the two rows being relatively shifted from each other, in parallel as one line;
a line memory for receiving and temporarily storing said one line of signal electric charges transferred in parallel;
a horizontal transfer device;
an impressing device a plurality of electrically independent control voltages;
wherein said impressing device is configured to impress said control voltages such that said horizontal transfer device receives the signal electric charges selectively read out from said line memory and transfers the signal electric charges serially in a horizontal direction; and
an output device for converting the signal electric charges transferred by the horizontal transfer device into voltage and outputting the voltage, characterized in that
said impressing device is configured to impress said control voltages such that a signal of one pixel (left P3) at a cycle of four-pixel signals of four pixels horizontally adjoining with each other in said one line of the signal electric charges is added to three signals (left P2, left P1, right P2) of a preceding line adjoining to said one line, said preceding line transferred before said one line and accumulated in said horizontal transfer device; wherein said four pixels form one group;
the remaining signals of three pixels (left P4, right P4, right P3) in said one group in said line memory is transferred to the horizontal transfer device to vacate said line memory, and simultaneously a succeeding line of signal electric charges accumulated in said vertical transfer device are transferred to said line memory; and
a signal of one pixel (right P1) at a cycle of four-pixel consisting of one group of four signals of four pixels horizontally adjoining with each other in said succeeding line of the signal electric charges, are selectively read out from said line memory to said horizontal transfer device and added to said signals of three pixels (left P4, right P4, right P3) previously transferred.

4. A method of adding signal electric charges of a solid state imaging apparatus, said solid state imaging apparatus comprising:
a plurality of pixels forming a first matrix of adjoining rows and adjoining columns, wherein the pixels of adjoining rows and adjoining columns are relatively shifted from each other; the method comprising
transferring signals of two rows of the pixels, the pixels of the two rows being relatively shifted from one another, in parallel as one line from a plurality of vertical transfer devices;
receiving and temporarily storing said one line of signal electric charges transferred in parallel in a line memory;
impressing a plurality of electrically independent control voltages to a horizontal transfer device, said horizontal transfer device receiving signal electric charges selectively read out from said line memory and transferring the signal electric charges serially in a horizontal direction; and
converting the signal electric charges transferred by the horizontal transfer device to an output device into voltage and outputting the voltage from the output device, characterized in that an impressing device is configured to impress said control voltages such that a signal of one pixel (left P3) at a cycle of four-pixel signals of four pixels horizontally adjoining with each other in said one line of the signal electric charges is added to a signal of a preceding line (right P2) adjoining to said one line, said preceding line transferred before said one line and accumulated in said horizontal transfer device, wherein said four pixels form one group;
after all the signal electric charges in the horizontal transfer device are output, signals of the remaining three pixels (left P4, right P4, right P3) in said one group in said line memory are transferred to the horizontal transfer device and two pixels (right P3, left P4) are added in the horizontal transfer device to vacate said line memory, whereby two pixels (left P4, right P3) are transferred to the horizontal transfer device and then the third remaining pixel (right P4) is transferred to the horizontal transfer device and added to a pixel (right P3) in the horizontal transfer device, and simultaneously a succeeding line of signal electric charges accumulated in said vertical transfer device are transferred to said line memory;
a signal of one pixel (right P1) at a cycle of four-pixel signals of four pixels horizontally adjoining with each other in said succeeding line of the signal electric charges, a spatial phase of said one pixel of said succeeding line being 180 degree different from a spatial phase of said one pixel in said one line, is selectively read out from said line memory to said horizontal transfer device and added to a signal of the non-added pixel (left P4) in said one group; and
after all the signal electric charges in the horizontal transfer device are output, signals of the remaining three pixels (left P2, left P1, right P2) in said succeeding line in said line memory are transferred to the horizontal transfer device and two pixels (left P1, left P2) are added in the horizontal transfer device, whereby two pixels (left P1, right P2) are transferred to the horizontal transfer device and then the third remaining pixel (left P2) is transferred to the horizontal transfer device and added to a pixel (left P1) in the horizontal transfer device.

5. A method of adding signal electric charges of a solid state imaging apparatus, said imaging apparatus comprising:
a plurality of pixels forming a first matrix of adjoining rows and adjoining columns, wherein the pixels of adjoining rows and adjoining columns are relatively shifted from each other, the method comprising:
transferring signals of two rows of the pixels, the pixels of the two rows being relatively shifted from one another, in parallel as one line from a plurality of vertical transfer devices;
receiving and temporarily storing said one line of signal electric charges transferred in parallel in a line memory;
impressing a plurality of electrically independent control voltages to a horizontal transfer device, said horizontal transfer device receiving the signal electric charges selectively read out from said line memory and transferring the signal electric charges serially in a horizontal direction; and
an output device converting the signal electric charges transferred by the horizontal transfer device to an output device into voltage and outputting the voltage, characterized in that
an impressing device is configured to impress said control voltages such that a signal of one pixel (left P3) at a cycle of four-pixel signals of four pixels horizontally adjoining with each other in said one line of the signal electric charges is added to three signals (left P2, left P1, right P2) of a preceding line adjoining to said one line, said preceding line transferred before said one line and accumulated in said horizontal transfer device; wherein said four pixels form one group;

the remaining signals of three pixels (left P4, right P4, right P3) in said one group in said line memory is transferred to the horizontal transfer device to vacate said line memory, and simultaneously a succeeding line of signal electric charges accumulated in said vertical transfer device are transferred to said line memory; and a signal of one pixel (right P1) at a cycle of four-pixel consisting one group of four signals of four pixels horizontally adjoining with each other in said succeeding line of the signal electric charges, are selectively read out from said line memory to said horizontal transfer device and added to said signals of three pixels (left P4, right P4, right P3) previously transferred.

\* \* \* \* \*